(12) United States Patent
Mori et al.

(10) Patent No.: US 6,211,893 B1
(45) Date of Patent: Apr. 3, 2001

(54) MULTI-GRADATION RECORDING METHOD

(75) Inventors: Satoshi Mori, Osaka; Naoki Yoshida, Tokyo-to, both of (JP)

(73) Assignee: Fujicopian Co., Ltd., Osaka (JP)

( * ) Notice: Subject to any disclaimer, the term of this patent is extended or adjusted under 35 U.S.C. 154(b) by 0 days.

(21) Appl. No.: 09/392,157

(22) Filed: Sep. 8, 1999

(30) Foreign Application Priority Data

Sep. 9, 1998 (JP) ................................................. 10-255093

(51) Int. Cl.$^7$ ................................ B41J 2/205; B41J 2/21; B41J 2/52; B41J 2/525
(52) U.S. Cl. .......................... 347/183; 347/180; 347/181; 347/182; 347/211
(58) Field of Search .................................. 347/180, 181, 347/182, 183, 211; 400/120.05, 120.06, 120.07; 358/429, 432, 433

(56) References Cited

U.S. PATENT DOCUMENTS

| | | | |
|---|---|---|---|
| 4,675,697 | * | 6/1987 | Sasaki et al. ........................ 347/182 |
| 4,691,211 | * | 9/1987 | Brownstein ......................... 347/180 |
| 4,779,102 | * | 10/1988 | Sasaki ................................. 347/180 |
| 4,873,535 | * | 10/1989 | Sasaki ................................. 347/182 |
| 4,952,085 | * | 8/1990 | Rein .................................... 347/182 |
| 5,112,149 | * | 5/1992 | Suenaga ............................. 347/180 |

* cited by examiner

*Primary Examiner*—Huan Tran
(74) *Attorney, Agent, or Firm*—Fish & Neave

(57) ABSTRACT

A multi-gradation recording method wherein the recording energy in high density region can be reduced, and the rough appearance in low density region or high density region and notchy appearance in profile or line of the image can be reduced while maintaining the level of reproduction of intermediate tones obtained by the conventional recording method using the zigzag pattern or the stripe pattern is provided which comprises: using a printer of the type wherein each one pixel is formed by using each one recording element and the optical density of the pixel formed is represented by the magnitude of the area of the pixel, dividing input data into two or more groups with respect to the data corresponding to pixels to be arranged in principal scanning direction, correcting the data of each group on the basis of the corresponding γ correction data, the γ correction data for the respective groups being different from each other, and performing recording on the basis of the corrected data wherein the pixels of all the groups are recorded at the same time in the same scanning operation in principal scanning direction.

5 Claims, 7 Drawing Sheets

MULTI-GRADATION RECORDING METHOD

BACKGROUND OF THE INVENTION

The present invention relates to a multi-gradation recording method using a printer of the type wherein each one pixel is formed by using each one recording element and the optical density of one pixel formed is represented by the magnitude of the area of the pixel, e.g. printers of various recording systems such as xerography, thermal transfer recording and ink jet recording.

In various recording systems such as xerography, thermal transfer recording and ink jet recording, it is difficult to perform multi-gradation recording according to a density gradation method because it is hard to control the density of pixels to be recorded by toner or ink by itself. Therefore, in such recording systems, a variety of attempts have been made to perform satisfactory multi-gradation recording.

With respect to a method of representing tones, especially intermediate tones by an area gradation method of changing the size of one dot, for instance, in the thermal transfer system, a method of arranging dots to be transferred in the so called zigzag pattern or checkered flag pattern is disclosed in JP, B, 6-59739. It is possible to reproduce satisfactory intermediate tones by the use of this recording method. However, in performing recording in high density region, a large amount of recording energy is required because it is necessary to transfer an ink dot having a larger size than that of a heating resistor of a thermal head. Further, the recording method has the drawback that in performing recording in low density region or high density region, the resultant image has rough appearance and the profile or line of the image is notched due to large clearance between the dots.

Another method of arranging dots to be transferred every other one-dot line, i.e. in a stripe pattern in reproducing intermediate tones is disclosed in JP, B, 7-46828. This method copes with recording in high density region by arranging dots in clearance between the stripes, but the rough appearance or notchy line in low density region is not taken into consideration.

In view of the foregoing, it is an object of the present invention to provide a multi-gradation recording method wherein the recording energy in high density region can be reduced, and the rough appearance in low density region or high density region and notchy appearance in profile or line of the image can be reduced while maintaining the same level of reproduction of intermediate tones as obtained by the conventional recording method using the zigzag pattern or the stripe pattern.

This and other objects of the present invention will become apparent from the description hereinafter.

SUMMARY OF THE INVENTION

The present invention provides (1) a multi-gradation recording method comprising:
using a printer of the type wherein each one pixel is formed by using each one recording element and the optical density of the pixel formed is represented by the magnitude of the area of the pixel,
dividing input data into two or more groups with respect to the data corresponding to pixels to be arranged in principal scanning direction,
correcting the data of each group on the basis of the corresponding γ correction data, the γ correction data for the respective groups being different from each other, and
performing recording on the basis of the corrected data wherein the pixels of all the groups are recorded at the same time in the same scanning operation in principal scanning direction.

The present invention further provides (2) the multi-gradation recording method of the above (1), wherein the input data is divided into a group of data corresponding to even-numbered pixels and a group of data corresponding to odd-numbered pixels in principal scanning direction.

The present invention furthermore provides (3) the multi-gradation recording method of the above (2), wherein the recording control corresponding to the group of even-numbered pixels and the recording control corresponding to odd-numbered pixels in principal scanning direction are changed alternately every other unit of secondary scanning or every appropriate number of units of secondary scanning.

The present invention also provides (4) a multi-gradation recording method comprising:
using a printer of the type wherein each one pixel is formed by using each one recording element and the optical density of the pixel formed is represented by the magnitude of the area of the pixel,
dividing input data into two or more groups with respect to the data corresponding to lines in secondary scanning direction,
correcting the data of each group on the basis of the corresponding γ correction data, the γ correction data for the respective groups being different from each other, and
performing recording on the basis of the corrected data.

The present invention further provides (5) the multi-gradation recording method of the above (4), wherein the input data is divided into a group of data corresponding to even-numbered lines and a group of data corresponding to odd-numbered lines in secondary scanning direction.

BRIEF EXPLANATION OF THE DRAWINGS

FIG. 1 is a schematic view showing an example of the division pattern of input data (zigzag division pattern) according to the present invention.

FIG. 2 is a schematic view showing another example of the division pattern of input data (vertical stripe division pattern) according to the present invention.

FIG. 3 is a schematic view showing still another example of the division pattern of input data (horizontal stripe division pattern) according to the present invention.

DETAILED DESCRIPTION

Figure 4:
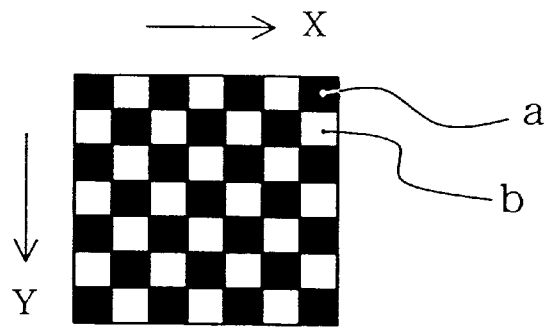
FIG. 4 is a schematic view showing a zigzag pattern of the prior art.

The multi-gradation recording method of the present invention is one using a printer of the type wherein each one pixel is formed by using each one recording element and the optical density of the pixel formed is represented by the magnitude of the area of the pixel. Herein, one recording element refers to one heating resistor element of a thermal head in thermal transfer recording systems; one ink nozzle of a printing head in ink jet recording systems; and one minimum dot capable of being controlled independently in xerographic recording systems.

According to a first feature of the present invention, input data to a printer are divided into two or more groups with respect to the data corresponding to pixels to be arranged in principal scanning direction, and the data of each group are corrected on the basis of the corresponding γ correction data. The γ correction data for the respective groups are different from each other. Then recording is performed on the basis of the corrected data. In that case, the pixels of all the groups are recorded at the same time in the same scanning operation in principal scanning direction, which is entirely different from the prior art.

According to a second feature of the present invention, input data to a printer are divided into two or more groups with respect to the data corresponding to lines in secondary scanning direction, and the data of each group are corrected on the basis of the corresponding γ correction data. The γ correction data for the respective groups are different from each other. Then recording is performed on the basis of the corrected data.

When the number of groups in grouping the input data is many, recording control becomes complicated. Therefore, it is preferable to divide the input data into 2 groups. Hereinafter, detailed explanations will be given with respect to the case of dividing the input data into 2 groups.

According to the first feature of the present invention, first the input data are divided into a group of data corresponding to even-numbered pixels and a group of data corresponding to odd-numbered pixels in principal scanning direction. Then, for each group, the data are corrected on the basis of the γ correction data which are different for each group, and recording is performed on the basis of the corrected data. In that case, when the recording control corresponding to the group of even-numbered pixels and the recording control corresponding to odd-numbered pixels in principal scanning direction are changed alternately every unit of secondary scanning, recording is controlled on the basis of a zigzag division pattern. When such an alternate change every unit of secondary scanning is not performed, recording is controlled on the basis of a vertical or longitudinal stripe division pattern. In the case of changing recording controls for the respective groups in secondary scanning direction, the changing may be performed every appropriate number of units of secondary scanning, i.e. every two or more units of secondary scanning.

According to the second feature of the present invention, first the input data are divided into a group of data corresponding to even-numbered lines and a group of data corresponding to odd-numbered lines in secondary scanning direction. Then, for each group, the data are corrected on the basis of the γ correction data which are different for each group, and recording is performed on the basis of the corrected data. In that case, recording is controlled on the basis of a horizontal or transverse stripe division pattern.

Figures 1, 2, 3:
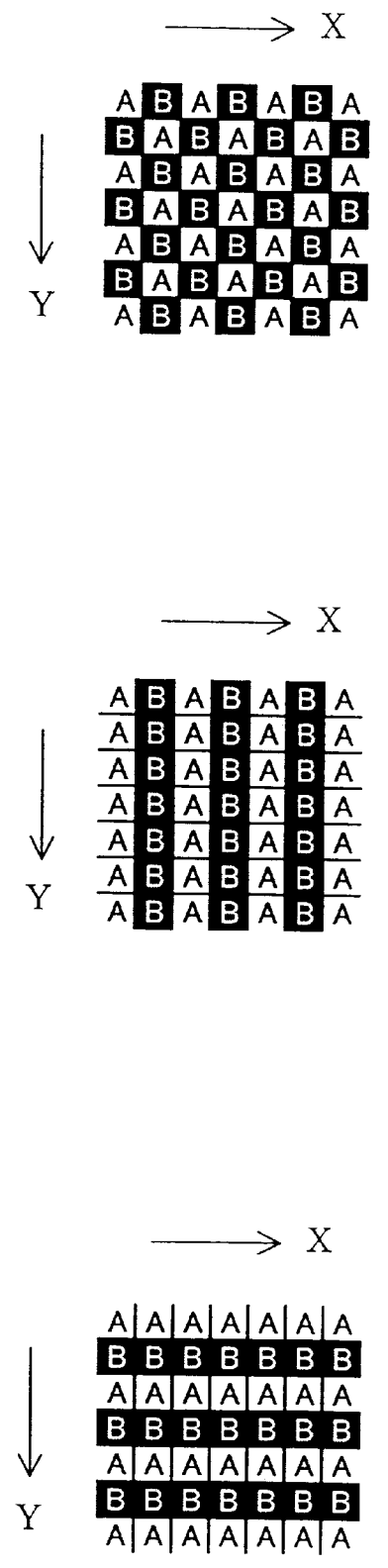
Figure 7:
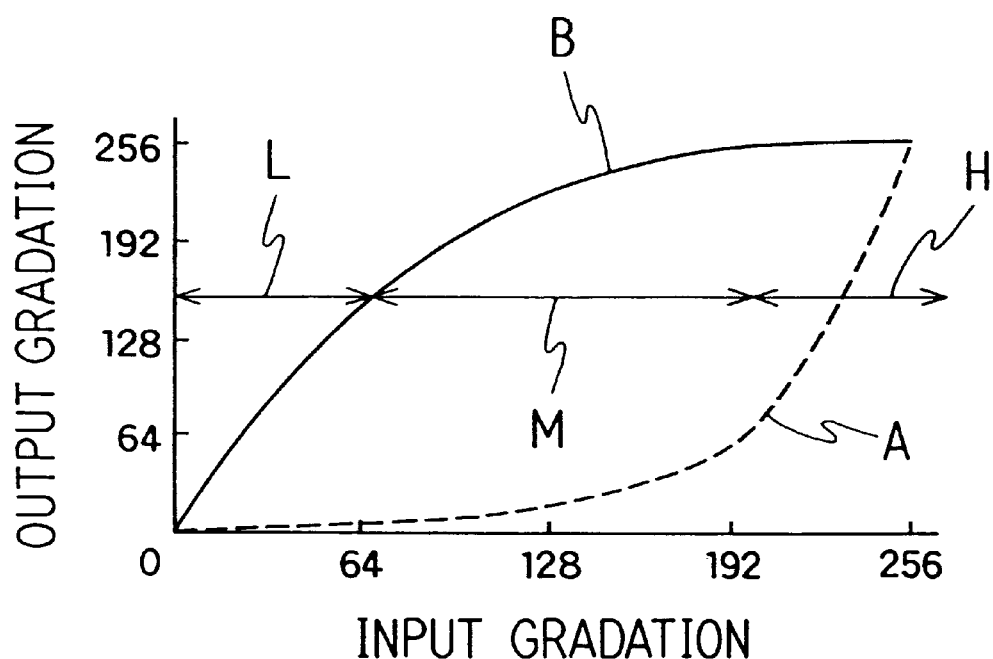
FIG. 7 is a graph showing an example of the γ correction curve according to the present invention.

In the case that all pixels to be recorded are divided into group A and group B which are independently controlled to be recorded in accordance with the recording method of the present invention, a zigzag division pattern (according to the first future) is shown in FIG. 1, a vertical or longitudinal stripe pattern (according to the first future) in FIG. 2 and a horizontal or transverse stripe pattern (according to the second feature) in FIG. 3. FIGS. 1 to 3, "A" indicates a pixel belonging to group A of input data, and "B" indicates a pixel belonging to group B of input data. In FIG. 7, curve A indicates an example of γ correction curve for group A and curve B an example of γ correction curve for group B.

Figure 5:
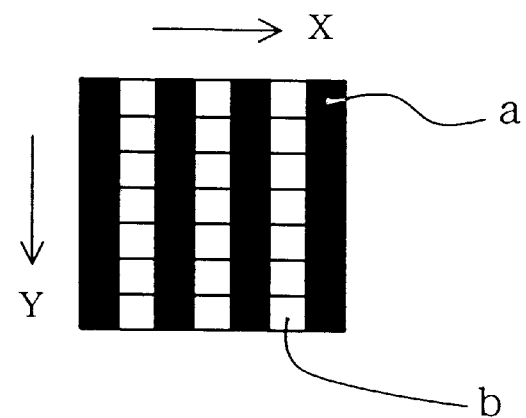
FIG. 5 is a schematic view showing a vertical stripe pattern of the prior art.
Figure 6:
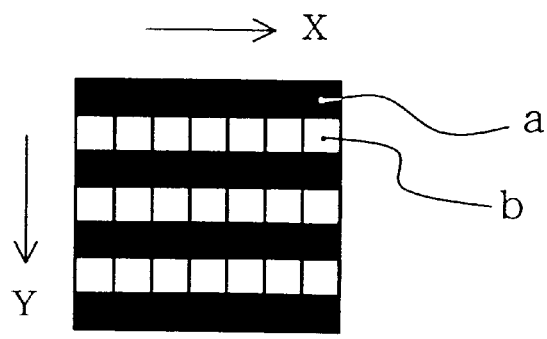
FIG. 6 is a schematic view showing a horizontal stripe pattern of the prior art.
Figure 8:
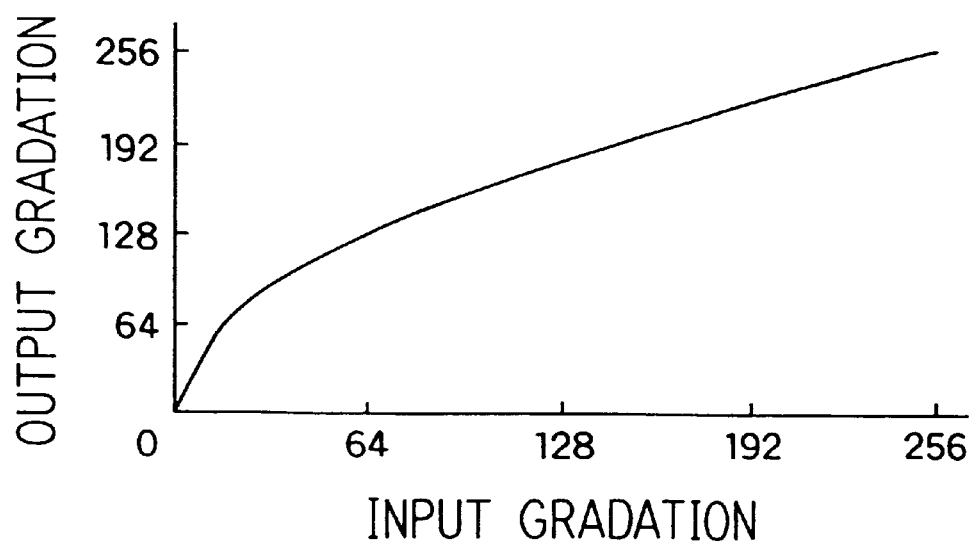
FIG. 8 is a graph showing a γ correction curve of the prior art.

Further, transfer patterns of the conventional recording methods in a simple zigzag pattern, a simple vertical stripe pattern and a simple horizontal stripe pattern are shown in FIG. 4, FIG. 5 and FIG. 6, respectively, and an example of γ correction curve for such patterns is shown in FIG. 8. In FIGS. 4 to 6, "a" indicates a printed portion and "b" indicates non-printed portion.

In FIGS. 1 to 7, arrow X indicates principal scanning direction and arrow Y indicates secondary scanning direction. For instance, in thermal transfer recording systems using a thermal head, principal scanning direction corresponds to the direction wherein heating resistor elements are arranged in line, and secondary scanning direction corresponds to the direction wherein principal scanning line (line on which pixels are arranged along principal scanning direction) is arranged successively, i.e. the direction perpendicular to principal scanning direction. When using a line head, secondary scanning direction corresponds to paper feed direction.

Figure 9:
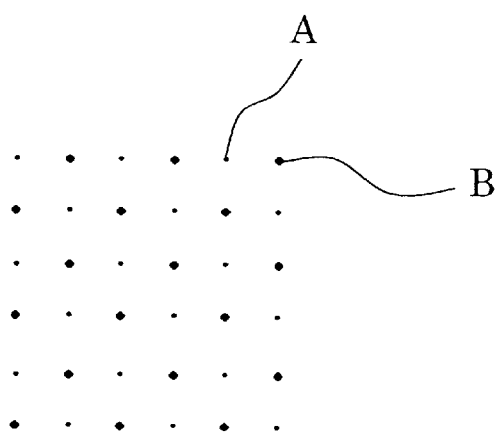
FIG. 9 is a schematic view showing a recording state in low density region obtained by a recording method (zigzag division pattern method) according to the present invention.
Figure 10:
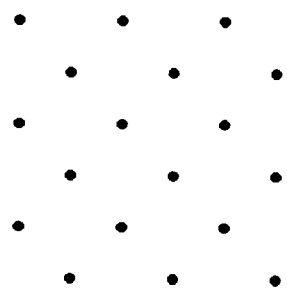
FIG. 10 is a schematic view showing a recording state in low density region obtained by the zigzag pattern method of the prior art.

When recording is performed according to a zigzag division pattern of the present invention, an example of recording state in low density region (region L shown in FIG. 7) is shown in FIG. 9. In FIG. 9, "A" indicates a pixel or dot belonging to group A and "B" indicates a pixel or dot belonging to group B. This is also applied to FIGS. 11, 13 and 15. In this region, the rough appearance is reduced as compared with the recording state in low density region obtained by the conventional zigzag pattern method as shown in FIG. 10 because in the recording method of the present invention recording is performed by utilizing all pixels, thereby decreasing the clearance between the dots transferred.

Figure 11:
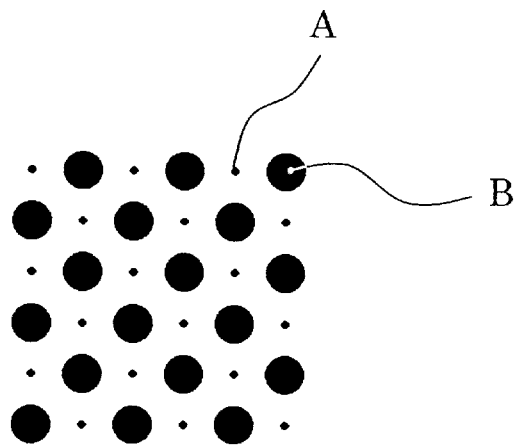
FIG. 11 is a schematic view showing a recording state in intermediate density region obtained by a recording method (zigzag division pattern method) according to the present invention.
Figure 12:
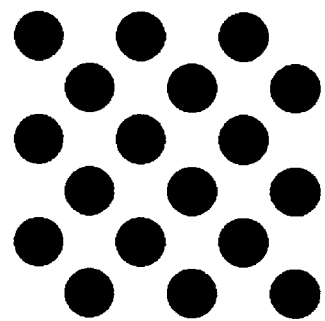
FIG. 12 is a schematic view showing a recording state in intermediate density region obtained by the zigzag pattern method of the prior art.

An example of recording state in intermediate density region (region M shown in FIG. 7) where recording is performed according to the zigzag division pattern is shown in FIG. 11. In intermediate density region, the difference in density between dots of group A and dots of group B is large as shown in FIG. 11. Concretely, the recording density, i.e. the area of the dot transferred, of group B is increased with increasing recording energy, while the recording density, i.e. the area of the dot transferred, of group A, is substantially unchanged with increasing recording energy. Consequently, a gradation representation according to area gradation method on the basis of the magnitude of the area of pixels recorded which is equivalent to that obtained by recording in zigzag pattern or stripe pattern using only dots of group B is realized. Thus, an intermediate tone representation of excellent image quality, which is on the same level with the representation in intermediate density region obtained by the conventional zigzag pattern method as shown in FIG. 12, can be obtained.

Figure 13:
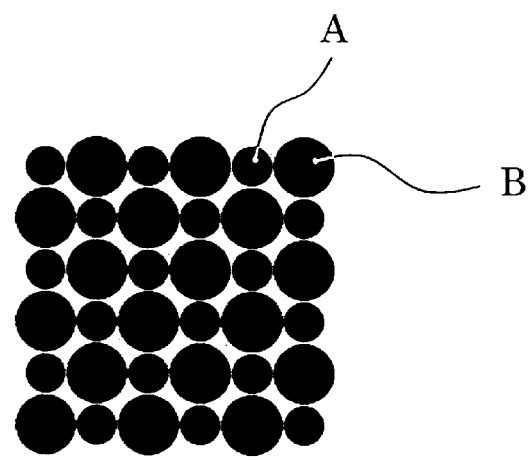
FIG. 13 is a schematic view showing a recording state in high density region obtained by a recording method (zigzag division pattern method) according to the present invention.
Figure 14:
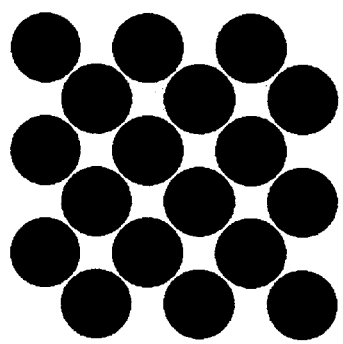
FIG. 14 is a schematic view showing a recording state in high density region obtained by the zigzag pattern method of the prior art.

An example of recording state in high density region (region H shown in FIG. 7) where recording is performed according to the zigzag division pattern is shown in FIG. 13. In this region, the clearance between the dots transferred is also reduced as compared with the recording state in high density region obtained by the conventional zigzag pattern method as shown in FIG. 14 because in the recording method of the present invention recording is performed by utilizing all pixels. Consequently, a recording in high density region with reduced roughness can be obtained.

Figure 15:
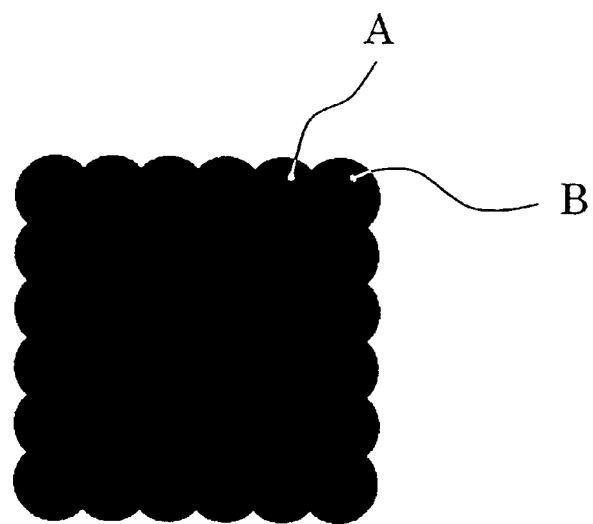
FIG. 15 is a schematic view showing a recording state in solid recording region obtained by a recording method (zigzag division pattern method) according to the present invention.
Figure 16:
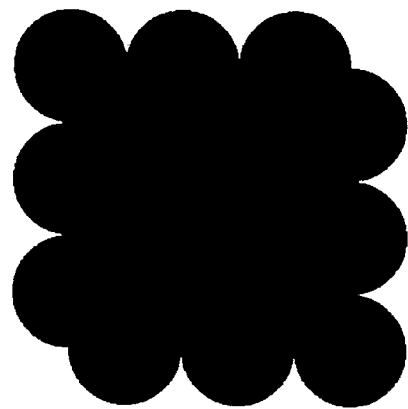
FIG. 16 is a schematic view showing a recording state in solid recording region obtained by the zigzag pattern method of the prior art.

An example of recording state in solid-recorded region where recording is performed according to the zigzag division pattern is shown in FIG. 15. In the case of performing solid-recording according to the recording method of the present invention, since the area to be covered by one unit of pixel may be small as compared with the conventional recording method according to simple zigzag or stripe pattern, the energy required for obtaining the maximum density in solid-recording can be reduced as compared with the conventional method. Further, since in the recording method of the present invention recording is performed by utilizing all pixels over all regions from low density to high density, notchy appearance in profile or line is reduced as compared with the conventional method (FIG. 16).

PREFERRED EMBODIMENTS

The recording method of the present invention will be described in more detail by way of an Example using a thermal transfer printer. It is to be understood that the present invention will not be limited to the Example, and various changes and modifications may be made in the invention without departing from the spirit and scope thereof.

In this example, a zigzag division pattern (FIG. 1) was used. A simple zigzag pattern (FIG. 4) in the conventional method was used for a comparative example.

The particulars of the printer used and the recording conditions are as follows:

Printer: test machine made as a trial

Thermal head: flat head (line head) wherein heating resistor elements were arranged at a density corresponding to 300 dots/inch Recording speed: about 2 inches/sec.

Recording energy: variable in a range of 0 to 100 mJ/mm$^2$

Number of gradations: 256

Thermal transfer recording medium: a 4.5 μm thick polyester film having a black heat meltable ink layer applied at a coating amount of 1.5 g/m$^2$ Receptor: smooth surface paper for thermal transfer recording (HR-260 made by Hokuetsu Seishi Kabushiki Kaisha)

The γ correction curve shown in FIG. 7 was used in this example and the γ correction curve in the conventional method shown in FIG. 8 was in the comparative example.

Figure 17:
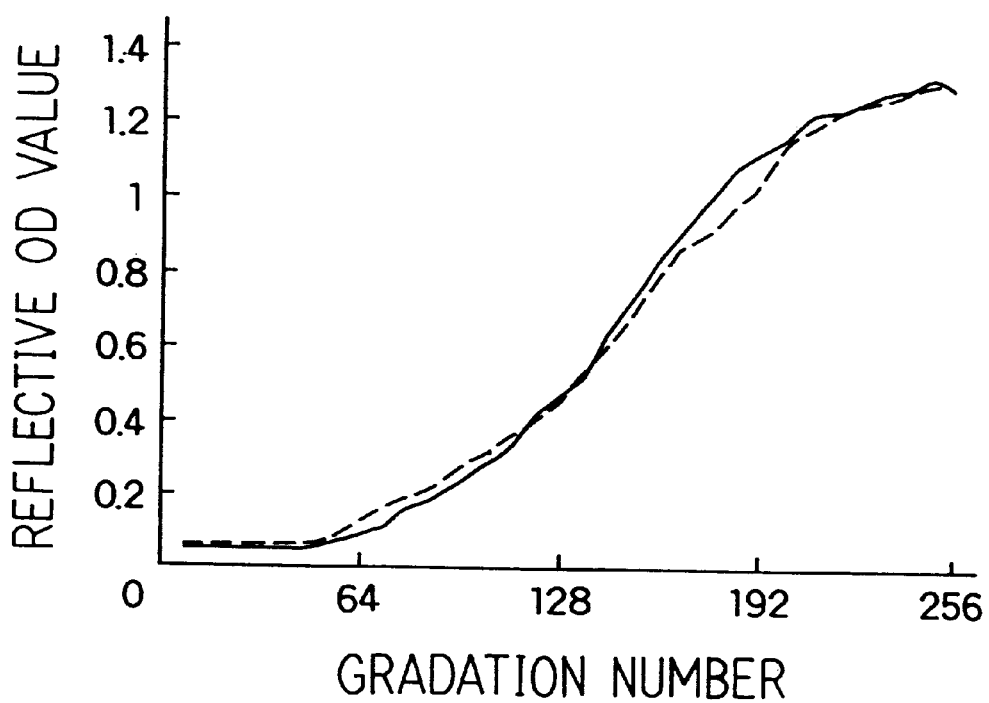
FIG. 17 is a graph showing the respective relationships between the gradation number and the reflective OD value obtained by the recording method of the present invention (solid line) and the prior art (broken line).

Gradation patterns were printed under the above conditions and the density of the printed patterns was evaluated in terms of reflective optical density. The reflective optical density was measured with a reflective densitometer, RD-918, made by Macbeth. The results are shown in FIG. 17.

There was no substantial difference between the gradation characteristics obtained by this example (solid line) and that obtained by the conventional zigzag pattern method (comparative example, broken line). In this example, the gradation performance comparable to that obtained by the conventional zigzag pattern method could be achieved.

In this example (zigzag division pattern), solid printing could be performed at a recording energy of 16.0 mJ/mm$^2$, while in the conventional zigzag pattern method (comparative example), a recording energy of about 25.0 mJ/mm$^2$ was required for solid printing. That is, in this example, the recording energy required for obtaining the maximum density was reduced as compared with the conventional zigzag pattern method.

Although in the conventional zigzag pattern method (comparative example), the distance between two dots which are the nearest to each other was about 170 μm, the distance was as small as about 85 μm in this example. Consequently, the rough appearance in low or high density region was reduced and line or profile of figure was smooth with reduced notchy appearance.

As described above, when multi-gradation recording is performed according to the recording method of the present invention, the recording energy can be reduced, and recorded images with reduced rough appearance and notchy appearance can be provided while maintaining the gradation characteristics of the same level as obtained by the conventional zigzag pattern recording method.

What is claimed is:

1. A multi-gradation recording method comprising:

using a printer of the type wherein each one pixel is formed by using each one recording element and the optical density of the pixel formed is represented by the magnitude of the area of the pixel, dividing input data into two or more groups with respect to the data corresponding to pixels to be arranged in principal scanning direction, correcting the data of each group on the basis of the corresponding γ correction data, the γ correction data for the respective groups being different from each other, and performing recording on the basis of the corrected data wherein the pixels of all the groups are recorded at the same time in the same scanning operation in principal scanning direction.

2. The multi-gradation recording method of claim 1, wherein the input data is divided into a group of data corresponding to even-numbered pixels and a group of data corresponding to odd-numbered pixels in principal scanning direction.

3. The multi-gradation recording method of claim 2, wherein the correction of the data corresponding to the group of even-numbered pixels in principal scanning direction on the basis of the corresponding γ correction data and the correction of the data corresponding to the group of odd-numbered pixels in principal scanning direction on the basis of the corresponding γ correction data are changed alternately every unit of secondary scanning or every appropriate number of units of secondary scanning.

4. A multi-gradation recording method comprising:

using a printer of the type wherein each one pixel is formed by using each one recording element and the optical density of the pixel formed is represented by the magnitude of the area of the pixel, dividing input data into two or more groups with respect to the data corresponding to lines in secondary scanning direction, correcting the data of each group on the basis of the corresponding γ correction data, the γ correction data for the respective groups being different from each other, and performing recording on the basis of the corrected data.

5. The multi-gradation recording method of claim 4, wherein the input data is divided into a group of data corresponding to even-numbered lines and a group of data corresponding to odd-numbered lines in secondary scanning direction.

* * * * *